US012750230B2

(12) United States Patent
Jurss et al.

(10) Patent No.: US 12,750,230 B2

(45) Date of Patent: Sep. 29, 2026

(54) SECURE DEVICE INFORMATION DISPLAY WITH AUTHENTICATION USING SOFTWARE DEVELOPMENT KIT (SDK)

(71) Applicant: Visa International Service Association, San Francisco, CA (US)

(72) Inventors: Penny Jurss, Leander, TX (US); Debopam Das, Austin, TX (US); Suresh Kalakrishnan, Cedar Park, TX (US); Hari Krishna Annam, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 113 days.

(21) Appl. No.: 18/699,686

(22) PCT Filed: Sep. 19, 2022

(86) PCT No.: PCT/US2022/044007

§ 371 (c)(1),
(2) Date: Apr. 9, 2024

(87) PCT Pub. No.: WO2023/064064

PCT Pub. Date: Apr. 20, 2023

(65) Prior Publication Data

US 2024/0405994 A1 Dec. 5, 2024

Related U.S. Application Data

(60) Provisional application No. 63/255,177, filed on Oct. 13, 2021.

(51) Int. Cl.

*H04L 9/32* (2006.01)
*G06Q 20/32* (2012.01)

(Continued)

(52) U.S. Cl.

CPC ....... *H04L 9/3228* (2013.01); *G06Q 20/3255* (2013.01); *G06Q 20/367* (2013.01); *G06Q 20/4018* (2013.01)

(58) Field of Classification Search

CPC .............. H04L 9/3228; G06Q 20/3255; G06Q 20/367; G06Q 20/4018

See application file for complete search history.

(56) References Cited

U.S. PATENT DOCUMENTS 10,713,649 B1 7/2020 Rule et al.
2014/0164254 A1 * 6/2014 Dimmick ........... G06Q 20/4012 705/44

(Continued)

OTHER PUBLICATIONS

PCT/US2022/044007 , "International Search Report and the Written Opinion", Nov. 30, 2022, 9 pages.

*Primary Examiner* — Ellen Tran

(74) *Attorney, Agent, or Firm* — Kilpatrick Townsend & Stockton LLP

(57) ABSTRACT

A method is disclosed. The method can be performed by at least a mobile device comprising a processor, and memory and display coupled to the processor, the memory storing an application comprising an SDK. The method comprises transmitting, by the SDK, an access credential identifier associated with a main credential to a processing computer. The processing computer then initiates an authentication process with respect to a user of the main credential. The processing computer then receives the main credential and additional data associated with the main credential. The method then includes the SDK receives the main credential and additional data from the processing computer. After the SDK receives the data, the main credential and the additional data are displayed on a display of the mobile device via the SDK.

18 Claims, 9 Drawing Sheets

(51) Int. Cl.

| | |
|---|---|
| *G06Q 20/36* | (2012.01) |
| *G06Q 20/40* | (2012.01) |

(56) References Cited

U.S. PATENT DOCUMENTS

| | | | | |
|---|---|---|---|---|
| 2015/0046339 | A1 | 2/2015 | Wong et al. | |
| 2015/0356560 | A1* | 12/2015 | Shastry ................ | G06Q 20/401 705/64 |
| 2016/0379208 | A1 | 12/2016 | Deliwala et al. | |
| 2019/0197537 | A1* | 6/2019 | Desai ................... | G06Q 20/385 |
| 2019/0295054 | A1* | 9/2019 | Purves ............... | G06Q 30/0226 |
| 2021/0150511 | A1* | 5/2021 | Mandloi .......... | G06Q 20/40145 |

* cited by examiner

SECURE DEVICE INFORMATION DISPLAY WITH AUTHENTICATION USING SOFTWARE DEVELOPMENT KIT (SDK)

CROSS-REFERENCES TO RELATED APPLICATIONS

This application is a National Stage of Internation Application No. PCT/US2022/044007, filed Sep. 19, 2022, which claims priority to and the benefit of U.S. Provisional Patent Application No. 63/255,177, filed on Oct. 13, 2021 which are herein incorporated by reference.

BACKGROUND

Mobile devices, such as mobile phones can have several applications on them. Examples of applications include storage applications (e.g., digital wallet applications), authorizing entity applications, resource provider applications, etc. Such applications can be used to accomplish different functions. For instance, after provisioning data relating to a user device to a storage application, the user can retrieve the data relating to the user device from the storage application to perform an interaction such as a payment transaction or a secure location access interaction.

Several technical problems with respect to the storage of credentials in applications on mobile devices.

One problem is that the applications on a mobile device may not be secure, and main credentials such as primary account numbers, and/or any associated additional data such as expiration dates and verification values such as CVV2 or DCVV2 values, can be considered sensitive data. The applications cannot store such data in some cases unless they meet the requirements of certain security organizations (e.g., the payments card industry standards or PCI standards). In some cases, the security requirements of certain security organizations can be difficult and costly to satisfy. This can be problematic if the user wants to conduct an interaction using a main credential and additional data associated with the main credential. For example, the user may wish to access a secure area of his employer, but does not have his employee access badge, but does have his mobile phone. The user may wish to retrieve his employee access badge number and a password from an employer application on his mobile phone, so that the user can input this information into an access terminal to enter a secure area of the employer. However, because of the security organization rules noted above, the storage application may not store his employee access badge number and/or password. As a result, the user is unable to enter the secure area. In another example, a user may wish to conduct a payment transaction on a merchant website, but the user is not currently in possession of their payment card which has a primary account number, an expiration date, and a CVV2 value printed on it. The user needs to enter this information into the merchant website to conduct the transaction. The user does have his mobile device and may believe that he can access this information using an application on his mobile phone, since he recently entered that information into the application. However, because of the security organization rules noted above, the application may not store all of the information. As a result, the user is unable to conduct the transaction.

Another problem is that each application of a plurality of applications on a mobile device may interface with different entities (e.g., a processing network computer, an authorizing entity computer, etc.) using their respective interfaces (e.g., APIs). Each application may be built by a different entity, and common functions on different applications may perform differently. For example, three applications built by three different entities on a mobile device may have authentication functions. Because each application is built by a different entity, the performance of the authentication functions may be better or worse depending upon the entity that built the application. Separately building all applications and all of their associated functions is cumbersome and time consuming, and can lead to inconsistent performance of some functions.

Embodiments of the disclosure address this problem and other problems individually and collectively.

SUMMARY

One embodiment of the invention includes a method performed by a mobile device comprising a processor, a memory, and a display coupled to the processor, the memory storing a mobile application comprising a software development kit (SDK). The method comprises transmitting, by the SDK, an access credential identifier associated with a main credential to a processing computer, wherein the processing computer initiates an authentication process with respect to a user of the main credential, and the processing computer obtains (e.g., receives) the main credential and additional data associated with the main credential; receiving, by the SDK from the processing computer, the main credential and the additional data; and displaying, by the display, via the SDK in the mobile application, the main credential and the additional data.

Another embodiment of the invention includes a mobile device comprising: a processor; a display; and a non-transitory computer readable medium comprising instructions, executable by the processor, for implementing operations including: transmitting, by the SDK, an access credential identifier associated with a main credential to a processing computer, wherein the processing computer initiates an authentication process with respect to a user of the main credential, and the processing computer obtains (e.g., receives) the main credential and additional data associated with the main credential; receiving, by the SDK from the processing computer, the main credential and the additional data; and displaying, by the display, via the SDK in the mobile application, the main credential and the additional data.

Yet another embodiment of the invention includes a method. The method comprises: receiving, by a processing computer from an application comprising a software development kit (SDK) installed on a mobile device, an access credential identifier associated with a main credential to the processing computer; in response to receiving the access credential identifier, obtaining, by the processing computer, the main credential and additional data associated with the main credential; and transmitting, by the processing computer to the SDK in the application of the mobile device, the main credential and the additional data, wherein the mobile device displays the main credential and the additional data.

A better understanding of the nature and advantages of embodiments of the invention may be gained with reference to the following detailed description and accompanying drawings.

DETAILED DESCRIPTION

Figure 1:
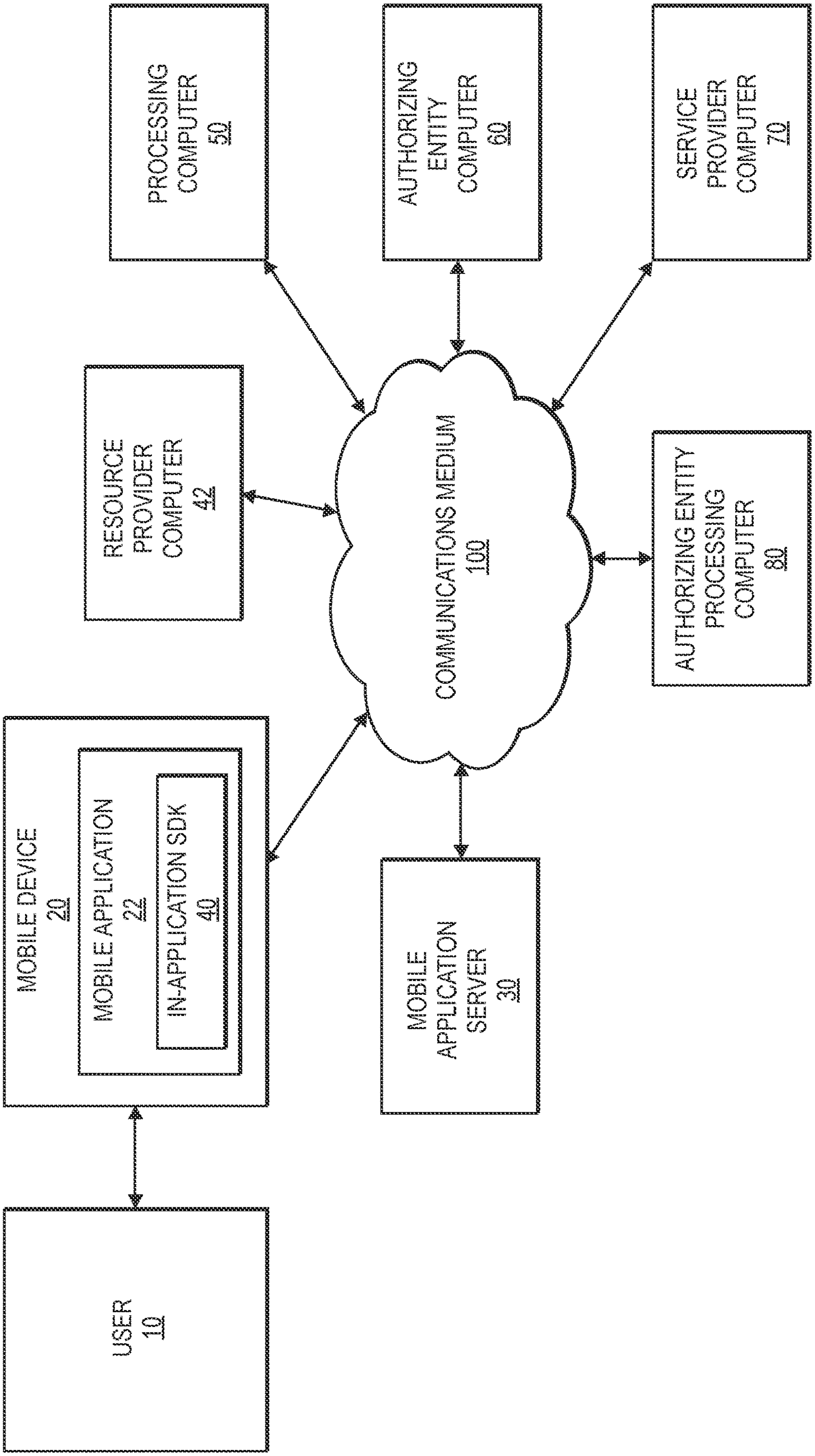
FIG. 1 shows a system according to embodiments.

Prior to discussing the details of some embodiments of the present disclosure, description of some terms may be helpful in understanding the various embodiments.

A "user" may include an individual or a computational device. In some embodiments, a user may be associated with one or more personal accounts and/or mobile devices. In some embodiments, the user may be a cardholder, account holder, or consumer.

A "mobile device" (sometimes referred to as a mobile communication device or communications device) may comprise any suitable electronic device that may be transported and operated by a user, which may also provide remote communication capabilities to a network. A mobile device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

A "user device" may include any suitable device that may be used to conduct a financial transaction, such as to provide payment credentials to a merchant. The user device may be a software object, a hardware object, or a physical object. As examples of physical objects, the user device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A user device may be associated with a value such as a monetary value, a discount, or store credit, and a user device may be associated with an entity such as a bank, a merchant, a processing network, or a person. A user device may be used to make a payment transaction. Suitable user devices can be hand-held and compact so that they can fit into a user's wallet and/or pocket (e.g., pocket-sized). Example user devices may include smart cards, magnetic stripe cards, keychain devices (such as the Speedpass™ commercially available from Exxon-Mobil Corp.), etc.

An "application" may be computer code or other data stored on a computer readable medium (e.g. memory element or secure element) that may be executable by a processor to complete a task.

A "storage application" can be an application that can store specific types of data. In some embodiments, a storage application be a digital wallet application.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided to make a payment from a payment account. Payment credentials can also include a user name, an expiration date, a gift card number or code, and any other suitable information.

An "access credential identifier" can be some information that is linked to a credential or additional data associated with the credential. In some embodiments, an access credential identifier can be an encrypted credential or it can be a credential identifier. It can also be part of a full credential (e.g., only a main credential, but not with additional data needed to form a complete credential).

A "main credential" can be an identifier that is unique to a particular entity or account. An example of a "main credential" can be a PAN, an employee ID, an account number, etc.

"Additional data" associated with a main credential can be an example of a credential, but would be information that supplements a main credential, but is not typically universally unique on its own without the main credential. For instance, an expiration date or a CVV2 may be used as additional credential data to a main credential such as a PAN, but may not be unique on their own.

A "token" may be a substitute value for a credential. A token may be a string of numbers, letters, or any other suitable characters. Examples of tokens include access tokens such as payment tokens, data that can be used to access secure systems or locations, etc.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "SDK" or may be a software development kit can be a collection of software development tools that can be present in an installable package that allows any applications that download the kit to enable the functions written in the kit. The functions present in an SDK may vary. For example, one SDK may have fingerprint recognition software. Another SDK may have token processing software.

In embodiments of the invention, a method can be performed by a mobile device comprising a processor, a memory, and a display coupled to the processor. The memory stores a mobile application comprising a software development kit (SDK). The method comprises transmitting, by the SDK, an access credential identifier associated with a main credential to a processing computer. After receiving the main credential, the processing computer initiates an authentication process with respect to a user of the main credential, and the processing computer obtains the main credential and additional data associated with the main credential. The processing computer then provides the main credential and the additional data to the SDK. A display in the mobile device then displays, via the SDK in the mobile application, the main credential, and the additional data to the user.

FIG. 1 shows a system according to embodiments. The system includes a user 10 operating a mobile device 20. A mobile application 22 can be installed on the mobile device 20 which can be serviced by a mobile application server 30. The mobile application 22 can have an in-application SDK 40 which can communicate directly with a processing computer 50. The processing computer 50 can be in communication with a service provider computer 70. The processing computer 50 can also be in communication with an authorizing entity processing computer 80, which can be in communication with an authorizing entity computer 60.

A resource provider computer 42 is also shown. The resource provider computer 42 can be operated by an entity that provides a resource such as goods or services, secure locations, etc. The resource provider computer 42 may be in communication with any of the entities in FIG. 1 via the communications medium 100.

The processing computer 50 may be configured to provide authorization services and clearing and settlement services for payment transactions. The processing computer 50 may include data processing subsystems, networks, and operations used to support and deliver authorization services, exception file services, and clearing and settlement services. An exemplary payment processing network may include VisaNet™. Payment processing networks such as VisaNet™ can process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing computer 25 may forward an authorization request received from the transport computer 112 to the authorizing entity computer 110 via a communication channel. The processing computer 108 may further forward an authorization response message received from the authorizing entity computer 110 to the transport computer 112.

In some embodiments, the authorizing entity computer 60 may be operated by an account issuer. Typically, the issuer is an entity (e.g., a bank) that issues and maintains an account of the user 10. The account may be a credit, debit, prepaid, or any other type of account.

The components in the system of FIG. 1 and any of the following figures can be in operative communication with each other through any suitable communications medium 100. Suitable examples of the communications medium 100 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices of FIG. 1 may be transmitted using a secure communications protocols such as, but not limited to Secure Hypertext Transfer Protocol (HTTPS).

Figure 2:
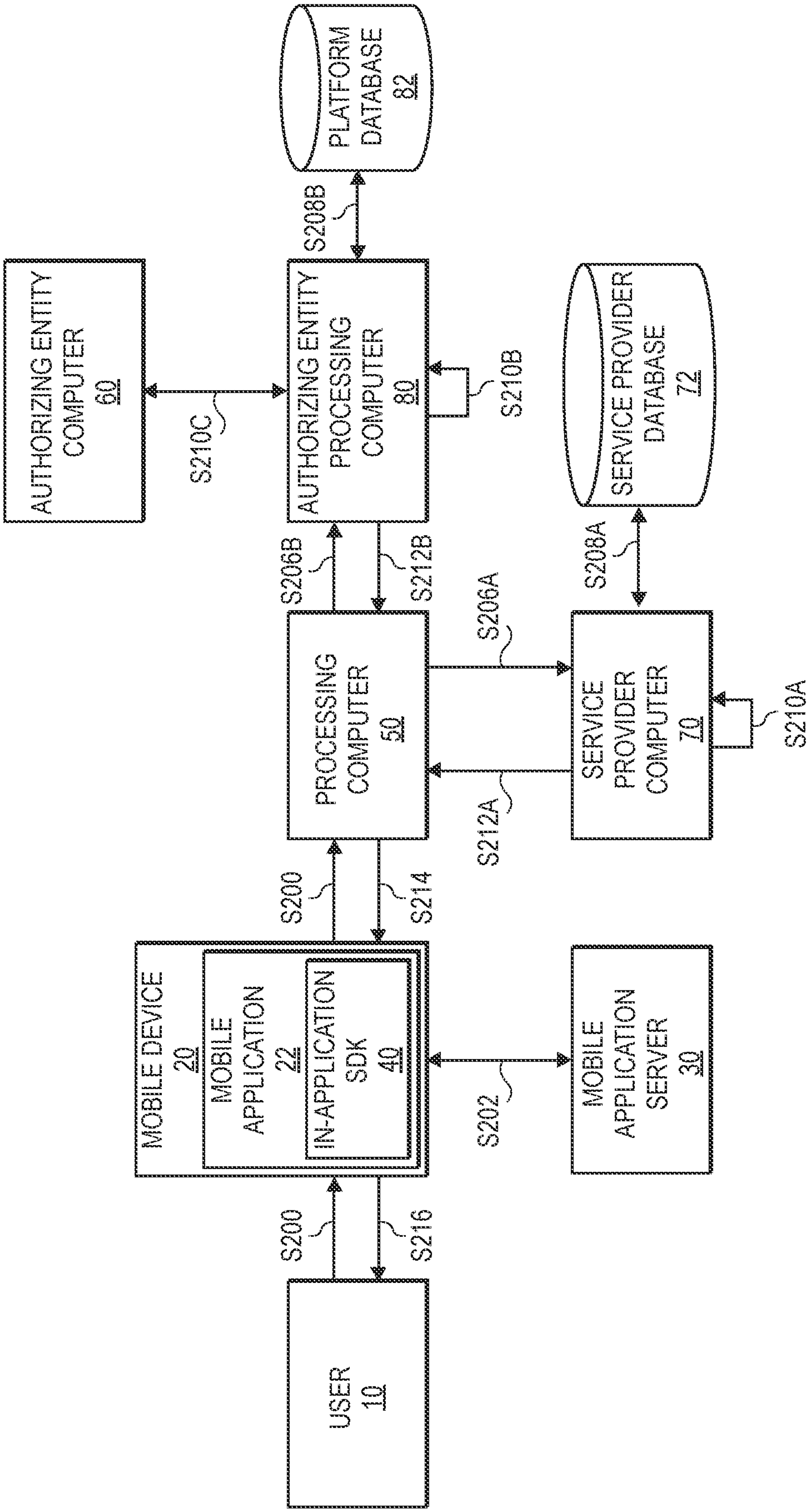
FIG. 2 shows a block diagram of a system and overlayed process flow according to embodiments.
Figure 3:
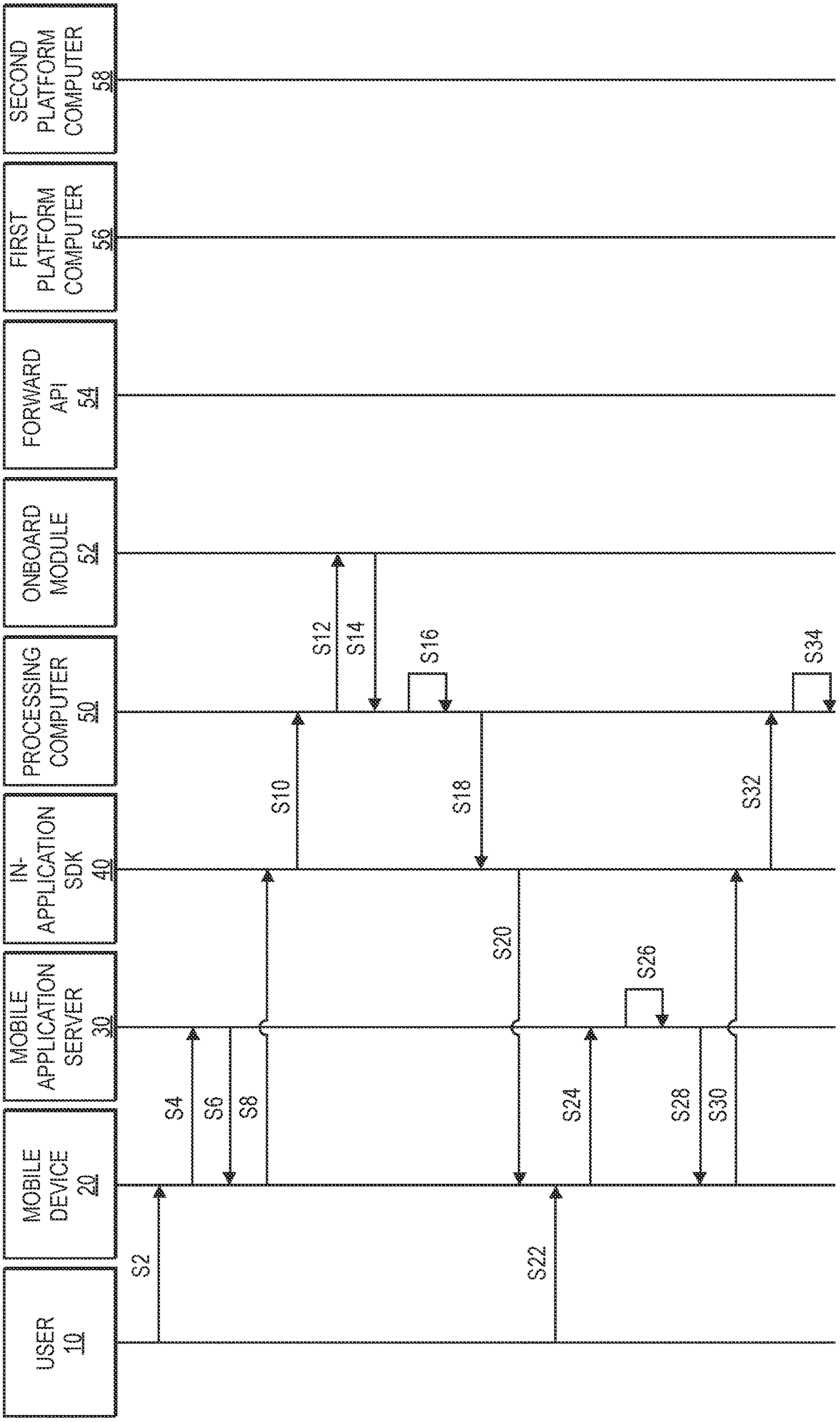
FIGS. 3-6 shows a sequence diagram illustrating a method according to embodiments.
Figure 4:
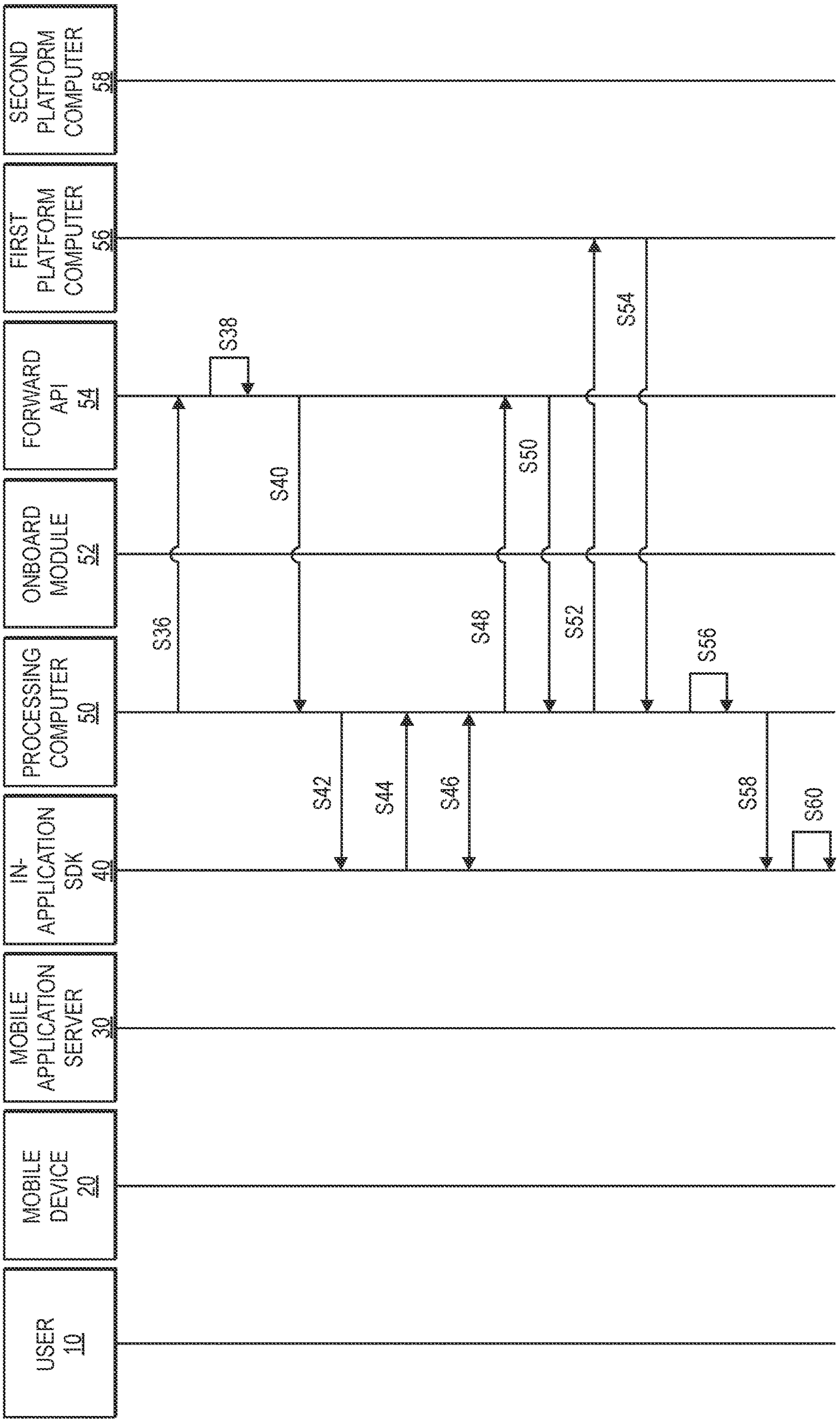
Figure 5:
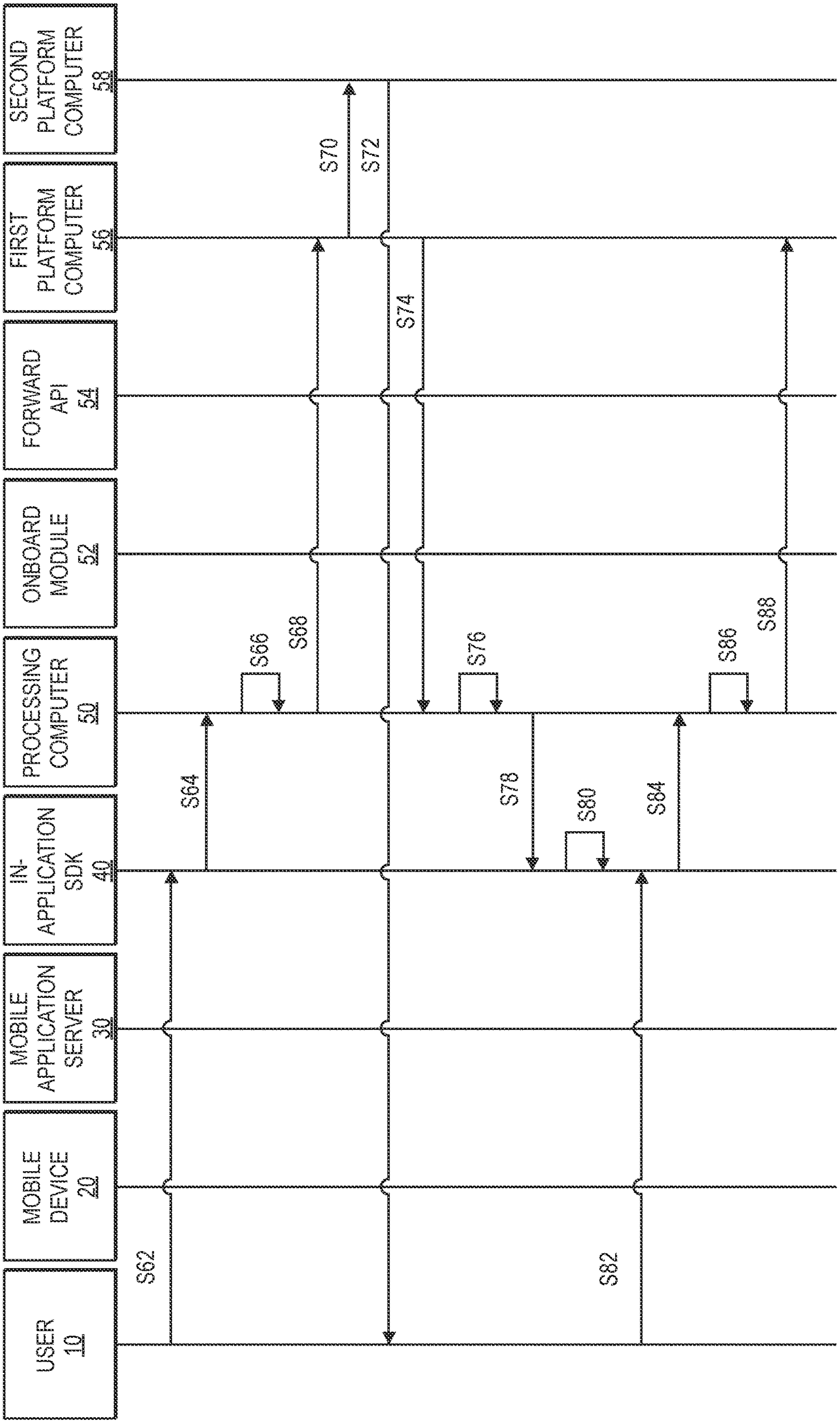
Figure 6:
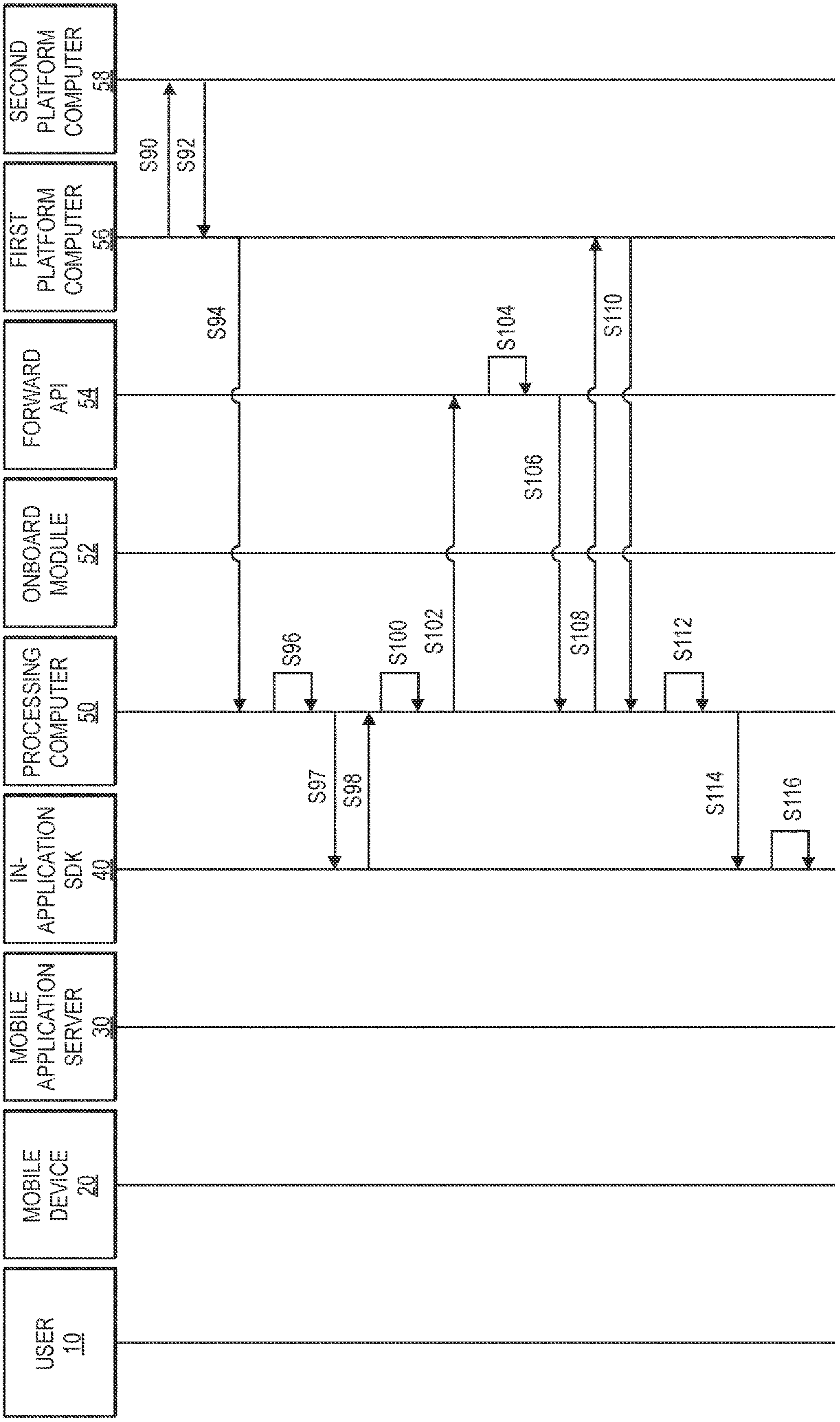

FIG. 2 shows a block diagram of a system and overlaid process flows according to embodiments.

FIG. 2 shows a mobile device 20 comprising a mobile application 12 with an in-application SDK 40. As described above, the mobile application 12 communicates with the mobile application server 30 and the processing computer 50. The processing computer 50 can be in communication with an authorizing entity computer 60 via an authorizing entity processing computer 80. In some embodiments, the authorizing entity processing computer 80 can store a private key that can be used to decrypt encrypted main credentials and/or encrypted additional data. The platform database 82 can store information including mappings between main credentials and user device identifiers. The processing computer 50 could alternatively be in communication with a service provider computer 70, which may be in communication with a service provider database 72.

The service provider computer 70 may be operated by a service provider such as a payment processor when the interaction to be performed is the retrieval of payment credentials. The authorizing entity processing computer 80 may also be operated by a payment processor such as an issuer processor.

In FIG. 2, the processing computer 50, the service provider computer 70, the service provider database 72, the authorizing entity processing computer 80, the authorizing entity computer 60, and the platform database 82 may all be operated by trusted entities such as payment processors, acquirers, and issuers in the instances where the credentials are payment credentials. As such, these entities are generally compliant with existing security requirements (e.g., PCI) and can store the main credentials and/or additional data. Entities such as the mobile device 20 and the mobile application server 30 may not be in compliance with security requirements in some cases.

In the processes described with respect to FIG. 2, the user 10 may initiate a request to view a main credential and additional data associated with a user device that is registered with an application on the mobile device 20. The user 10 may wish to enter the main credential and additional data to access a resource.

Prior to step S200, the user 10 may have downloaded the mobile application 22 on the mobile device 20. The user 10 may have also registered information about a user device such as a credit card, debit card, driver's license, employee ID card, etc. with the mobile application 22. This information may have been passed to the mobile application server 30. Upon receiving the information, the mobile application server 30 may take one or more actions with respect to the received information. In some embodiments, mobile application 22 can take a public key associated with a public-private key, encrypt the information, and store the encrypted information. The stored encrypted information can be stored in association with a graphic of the user device in the mobile application 22. The private key of the public-private key pair may be stored at the processing computer 50 and/or the authorizing entity processing computer 80. In other cases, the mobile application server 30 can pass the information to the processing computer 50. The processing computer 50 can then provide a credential identifier to the mobile application server 30. The credential identifier can be stored in association with a graphic of the user device in the mobile application 22.

After the user 10 has registered the information about the user device, the user may at some time in the future want to retrieve the information about the user device to perform an interaction such as a payment transaction or an access transaction to access a secure location or secure data. The user may need the information about the user device that was previously input into the mobile application 22. In one example, the information about the user device that may be needed by the user in a payment transaction may include the primary account number, expiration date, and CVV2 value. In other example, the information about the user device that may be needed by the user in an access transaction might be a card ID number and an expiration date.

In step S200, the user 10 can input a request for information about their user device into the mobile application 22 on the mobile device 20. The user 10 can then select a graphic of user device on the mobile application 22 on the mobile device 20 to obtain the main credential and the additional data for the selected user device.

In step S202, after the user 10 selects a user device in the mobile application 22, the mobile device 20 can communicate with the mobile application server 30. In one embodiment, the mobile device 20 retrieves a credential identifier from the mobile application server 30 in response to the selection. In another embodiment, the mobile device 20 retrieves an encrypted main credential and/or encrypted additional data from the mobile application server 30. The encrypted main credential and/or encrypted additional data can be encrypted with a public key of a public-private key pair, where the private key is stored at the processing computer 50 or the authorizing entity processing computer 80. In yet another embodiment, the mobile device 20 retrieves the main credential from the mobile application server 30, but not the additional data associated with the main credential. In each of these instances, neither the mobile application server 30 nor the mobile device 20 have the complete user device information requested by the user.

In step S204, after retrieving an access credential identifier such as a credential identifier, the encrypted credential and/or encrypted additional data, or the main credential from the mobile application server 30, the mobile device 20 can invoke the in-application SDK 40 to transmit the retrieved information to the processing computer 50.

In some embodiments, before obtaining the main credential and additional data associated with the main credential, the processing computer 50 can initiate an authentication process with respect to the user 10 of the mobile device 20. For example, the processing computer 50 may transmit a one-time password (OTP) or normal password request to the mobile device 20, and the user can enter the OTP or the password into the mobile device 20 authenticate themselves.

In response to receiving the access credential identifier from the in-application SDK 40, the processing computer 50 can obtain the main credential and additional data associated with the main credential. If the processing computer 50 receives a credential identifier from the in-application SDK 40, the processing computer 50 can communicate with the service provider computer 70 in steps S206A-S212A to obtain the main credential and additional data associated with the main credential. If the processing computer 50 receives the encrypted main credential and/or encrypted additional data or the main credential without the additional data from the in-application SDK 40, the processing computer 50 can communicate with the authorizing entity processing computer 80 in steps S206B-S212B to obtain the main credential and/or additional data from the authorizing entity computer 60 or the platform database 82.

In step S206A, if the processing computer 50 receives the credential identifier, the processing computer 50 can transmit the credential identifier to the service provider computer 70.

In step S208A, after receiving the credential identifier, the processing computer 50 can access a service provider database 72 using the credential identifier to retrieve the main credential and additional data associated with the main credential. The service provider database 72 can store a mapping between main credential identifiers and main credentials/additional data. In some embodiments, the retrieval of the main credential and the additional data may take place in multiple steps with multiple databases. For example, the service provider computer 70 could retrieve the main credential and additional information such as an expiration date from a first database. The service provider computer 70 could then use the main credential to obtain a CVV2 or dCVV2 value, and/or a billing address from a second database, another computer or a storage file in the service provider computer 70 (step 210A). The additional information can be advantageously stored in different databases or computers to provide greater security. For example, of one of the databases is compromised by a hacker or the like, then the hacker will not have all the additional data and the main credential needed to conduct an interaction.

In step S212A, after retrieving the further additional data, the service provider computer 70 can transmit the main credential and the obtained additional data associated with the main credential to the processing computer 50. For example, the service provider computer 70 can transmit a main credential such as a primary account number and additional data such as an expiration date and a CVV2 or DCVV2 value back to the processing computer 50.

In step S206B, the processing computer 50 receives an encrypted main credential and/or encrypted additional data from the in-application SDK 40 instead of the credential identifier. After this, the processing computer 50 could transmit the encrypted credential to the authorizing entity processing computer 80. Alternatively, if the processing computer 50 has the private key corresponding to the public key that was used to form the encrypted credential and/or encrypted additional data, the encrypted credential and/or encrypted additional data with the private key (or a symmetric key if symmetric encryption was used). Once the plaintext main credential and/or additional data is obtained, then that information may be mapped to an internal credential identifier that can be transmitted to the authorizing entity processing computer 80.

In step S208B, if the authorizing entity processing computer 80 receives the internal credential identifier, the authorizing entity processing computer 80 can access a platform database 82 using the internal credential identifier to retrieve the credential (e.g., the PAN of the selected user device).

In step S210B, after receiving the encrypted main credential from the processing computer 50 or retrieving the main credential from the platform database 82, the authorizing entity processing computer 80 can retrieve further additional data associated with the main credential from a storage file. For example, the authorizing entity processing computer 80 can store additional information, such as a billing address or a CVV2 in the storage file. The storage file can store a mapping between encrypted main credentials and additional data associated with the main credentials of the encrypted main credentials.

Alternatively, in step S210C, after receiving the encrypted main credential and/or additional data from the processing computer 50, the authorizing entity processing computer 80 can decrypt the encrypted main credential and/or the encrypted additional data and transmit the plaintext main credential and/or additional data associated with the main credential to the authorizing entity computer 60 to retrieve further additional data associated with the main credential. For example, the authorizing entity processing computer 80 can transmit the PAN and expiry date of a credit card to the authorizing entity computer 60, and the authorizing entity computer 60 can provide additional information of the credit card, such as a CVV2.

In step S212B, after retrieving the main credential (e.g., a PAN) and additional data (e.g., an expiry date and a CVV2) associated with the main credential, the authorizing entity processing computer 80 can transmit the main credential and the additional data associated with the main credential to the processing computer 50. For example, the authorizing entity processing computer 80 can transmit the PAN, the expiry date, and the CVV2 of a credit card to the processing computer 50.

In step S214, after receiving the main credential and additional data associated with the main credential, the processing computer 50 can transmit the main credential and additional data to the in-application SDK 40 in the mobile application installed on the mobile device 20.

In step S216, after receiving the main credential and the additional data from the processing computer 50, the in-application SDK 40 in the mobile application can display the main credential and the additional data on a display of the mobile device 20. For example, the in-application SDK 40 can generate a display of a virtual credit card with the PAN, expiry, and the CVV2 which is then displayed on the mobile device 20.

After the user 10 obtains the main credential and the additional data needed to conduct an interaction, the user 10 can provide this information to a resource provider computer 42 (see FIG. 1). The resource provider computer could validate the information or generate an authorization request message with the information. If an authorization request message is generated, it may be transmitted to the authorizing entity computer 60 via the processing computer 50 for approval. The authorizing entity may respond with an authorization response message approving of the transaction. A clearing and settlement process can then occur between the processing computer, the authorizing entity computer, and an acquirer computer associated with the resource provider at a later time.

FIGS. 3-6 shows a sequence diagram illustrating a method according to embodiments. FIGS. 3-6 show a greater detail of the process described by FIG. 2 for a user to view a main credential and additional data of user device that is stored on the mobile device 20. In addition to the components shown in FIG. 1, the sequence diagrams of FIGS. 3-6 include several APIs and modules maintained by the processing computer 50. An onboard module 52 can be used by the processing computer 50 to onboard a user device to the in-application SDK 40. A first platform computer 56 can be used to access and manage profile information of users. A second platform computer 58 can be used to facilitate the authentication of the user 10 using OTPs or other data.

In step S2, the user 10 can download and access the mobile application installed on the mobile device 20. For example, the user 10 can enter a PIN or a biometric to authenticate themselves with the mobile application such that the application opens. The mobile application can be provisioned with information associated with a plurality of user devices of the user, such as credit or debit cards of the user.

In step S4, after the user 10 authenticates themselves, the mobile device 20 may request a list of user devices provisioned to the mobile application from the mobile application server 30.

In step S6, after receiving the request for the list of user devices from the mobile device 20, the mobile application server 30 can transmit the list of user devices that are stored in association with the mobile application along with their graphics.

In step S8, after receiving the list of user devices, the mobile device 20 can initiate a registration process of the mobile device 20 with the in-application SDK 40. The registration process can allow the mobile device 20 to display main credentials and additional data associated with the main credentials of each user device in the list of user devices. In some embodiments, the registration request can include an identifier associated with the mobile device 20 (e.g., a phone number, a hardware ID, a serial number, etc.) and/or a registration request identifier, such that the mobile device 20 can be uniquely identified.

In step S10, after receiving the registration request from the mobile device 20, the in-application SDK 40 can register the mobile device 20 and confirm its integrity with the processing computer 50. For example, the in-application SDK 40 can retrieve the identifier associated with the mobile device 20 and can verify the files associated with the in-application SDK 40 have not been altered. After the verification is complete, the in-application SDK 40 can transmit the identifier associated with the mobile device 20 to the processing computer 50.

In step S12, after receiving the identifier associated with the mobile device 20 from the in-application SDK 40, the processing computer 50 can retrieve a configuration of the mobile application using the onboard module 52.

In step S14, the onboard module 52 can retrieve or generate a configuration file of the mobile application. For example, if the mobile device 20 has previously registered with the onboard module 52, the onboard module 52 can retrieve the configuration file that was generated in that prior registration. Otherwise, the onboard module 52 can generate a configuration file with some default settings (e.g., credential time-out duration, selection of a one-time password (OTP) method, etc.). In addition, the onboard module 52 can generate one or more data elements, such as a signing/verification key pair, a public/private key pair, a string of characters, random numbers, etc. The onboard module 52 can then transmit the configuration file and the data elements to the processing computer 50.

In step S16, after receiving the configuration file and the data elements from the onboard module 52, the processing computer 50 can generate a nonce and then sign it using the signing key of a signing/verification key pair included in data elements. The signed nonce can be used to authenticate communications between the processing computer 50 and the mobile device 20 including the in-application SDK 40. The nonce can provide uniqueness to the communication, and the signature on the nonce can provide assurance that any message including the signed nonce came from an authentic source.

In step S18, after generating the signed nonce, the processing computer 50 can transmit the nonce and the signed nonce to the in-application SDK 40.

In step S20, after receiving nonce and the signed nonce from the processing computer 50, the in-application SDK 40 make the nonce and the signed nonce available to the mobile device 20. For example, the in-application SDK 40 can push the signed nonce to the mobile application installed on the mobile device 20 such that the mobile application can store the signed nonce for later use. After obtaining the signed nonce, the mobile device 20 has completed registration, and the user 10 can then select a user device from the list of user devices.

In step S22, after registration is complete, the user 10 can make a selection to view the main credential and additional data associated with the main credential of a user device in the list of user devices as describe above. For example, the user 10 can select to view the PAN, expiry date, and CVV2 of a credit card from a list of payment cards.

In step S24, after the user 10 selects a user device, the mobile device 20 can transmit a get encrypted payload message comprising the nonce, the signed nonce, an access credential identifier for the selected user device, and an application identifier for the mobile application server 30. The get encrypted payload message can be a request for the main credential and additional data associated with the main credential of the selected user device.

In step S26, after receiving the get encrypted payload message, the mobile application server 30 can retrieve the one or more of the data elements. The mobile application server 30 can then verify the signed nonce using the one or more data elements. For example, the mobile application server 30 can retrieve the verification key in the data elements to verify the digital signature on the signed nonce. After verifying the signed nonce, the mobile application server 30 can generate a payload comprising an access credential identifier (e.g., as described in FIG. 2, an access credential identifier can be an encrypted primary account number (PAN) or a credential identifier that uniquely identifies the user device can be used), and an expiration date. The payload can then be encrypted using the one or more of the data elements. For example, the private key in the data elements can be used to encrypt the payload along with the nonce.

In step S28, after encrypting the payload, the mobile application server 30 can transmit the encrypted payload to the mobile device 20.

In step S30, after receiving the encrypted payload from the mobile application server 30, the mobile device 20 can generate a display details message comprising the encrypted payload using the in-application SDK 40. The display details message can be a request to receive the unencrypted main credential and additional data associated with the main credential of the selected user device.

In step S32, after receiving the display details message from the mobile device 20, the in-application SDK 40 can transmit the encrypted payload to the processing computer 50.

In step S34, after receiving the encrypted payload from the in-application SDK 40, the processing computer 50 can decrypt the encrypted payload using the one or more of the data elements. For example, the processing computer 50 can use the private key of the data elements (e.g., a public-private key pair) to decrypt the encrypted payload.

Optionally, in step S36, if the payload comprises a credential identifier, the processing computer 50 can transmit the credential identifier to the forward API 54.

In step S38, after receiving the credential identifier, the forward API 54 can communicate with the service provider computer 70 to retrieve the main credential and additional data associated with the main credential as described in steps S206A-S212A of FIG. 2. A profile identifier can identify a profile which stores contact methods (e.g., phone numbers, email addresses, etc.) that the user 10 has provided. Alternatively, the forward API 54 can communicate with the authorizing entity processing computer 80 to retrieve the main credential and the additional data associated with the main credential as described in steps S206B-S212B of FIG. 2. In some embodiments, the forward API 54 can additionally retrieve a profile identifier associated with the user 10 in the processing computer 50.

In step S40, after retrieving the main credential and the additional data associated with the main credential, the forward API 54 can provide the main credential and the additional data associated with the main credential to the processing computer 50.

Steps S42-S96 illustrate the processing computer 50 initiating an authentication process with the user 10. In the example described in these steps, the user 10 performs a one-time password (OTP) authentication, however other authentication processes, such as biometric authentications, static password authentication, or others, could be used as substitute.

In step S42, after receiving the main credential and the additional data associated with the main credential from the forward API 54, the processing computer 50 can prompt the in-application SDK 40 to initiate a one-time password authentication with the user 10.

In step S44, after receiving the prompt to initiate an OTP authentication, the in-application SDK 40 can transmit a get contact methods message comprising the encrypted payload to the processing computer 50.

As a first option, in step S46, if the contact methods are already available to the in-application SDK 40, the processing computer 50 can retrieve the list of contact methods from the in-application SDK 40. Each contact method in the list of contact methods can have a contact identifier. For example, if the list of contact methods includes 5 total contact methods, the first contact method could be identified by "1", the second by "2", the third by "3", etc.

As a second option, in step S48, the processing computer 50 can transmit a get profile information message comprising a profile identifier to the forward API 54.

In step S50, after receiving the get profile information message from the processing computer 50, the forward API 54 can validate the profile identifier (e.g., ensure that is in the correct format of a profile identifier) and access a profile of the user 10. The profile can comprise a list of contact methods of the user 10, which can be transmitted to processing computer 50.

As a third option, in step S52, the processing computer 50 can transmit the credential identifier to the first platform computer 56.

In step S54, after receiving the credential identifier from the processing computer 50, the first platform computer 56 can access a profile of the user 10 to retrieve a list of contact methods stored in the profile of the user 10 and transmit the list of contact methods to the processing computer 50. For example, the first platform computer 56 can identify a credit card account of the user 10, and transmit the email address and/or phone number associated with the credit card account to the processing computer 50.

In step S56, after receiving the list of contact methods of the user 10, the processing computer 50 can store the list of contact methods of the user 10.

In step S58, after storing the list of contact methods of the user 10, processing computer 50 can transmit the list of contact methods of the user 10 to the in-application SDK 40.

In step S60, after receiving the list of contact methods of the user 10 from the processing computer 50, the in-application SDK 40 can display an authentication screen comprising the list of contact methods to the user 10 via the mobile device 20. The authentication screen can prompt the user 10 to authenticate themselves using a one-time password.

In step S62, after viewing the authentication screen displayed by on the mobile device 20, the user 10 can select a contact method from the list of contact methods to complete the authentication. For example, the user 10 may select an email to which they will receive the one-time password that is used to authenticate themselves.

In step S64, after the user 10 selects a contact method, the in-application SDK 40 can transmit a generate OTP message to the processing computer 50 comprising a contact identifier corresponding to the user's selection of contact method and the signed nonce. In some embodiments, the generate OTP message can additionally include the first name and last name of the user 10.

In step S66, after receiving the generate OTP message from the in-application SDK 40, the processing computer 50 can verify the signed nonce using the shared secret. The processing computer 50 can use the contact identifier to retrieve the contact method selected by the user. For example, the processing computer 50 can access the list of contact methods using a contact identifier "1" and retrieve an email address.

In step S68, after retrieving the contact method select by the user, the processing computer 50 can transmit a generate OTP message comprising an owner identifier to the first platform computer 56. The owner identifier can identify the OTP request.

In step S70, after receiving the generate OTP message from the processing computer 50, the first platform computer 56 can transmit a request for an OTP to the second platform computer 58.

In step S72, after receiving the request for the OTP from the first platform computer 56, the second platform computer 58 can generate an OTP. The OTP can be a string of random or pseudorandom characters that is used to authenticate the user 10 for the request to view the main credential and the additional data associated with the main credential. The second platform computer 58 can transmit the OTP to the first platform computer 56 and to the user 10 via the communication method that was selected (e.g., email, text message, etc.).

In step S74, after receiving the OTP from the second platform computer 58, the first platform computer 56 can transmit a notification to the processing computer 50 that the OTP was generated and transmitted to the user 10.

In step S76, after receiving the notification that the OTP was sent to the user 10, the processing computer 50 may update an OTP status in memory to indicate that the user 10 has not yet authenticated themselves. The OTP status be associated with the owner identifier that identifies the specific OTP request. In one example, the OTP status can be set as "incomplete" to indicate that the user 10 has not completed the OTP authentication.

In step S78, after updating the OTP status in memory, the processing computer 50 can notify the in-application SDK 40 to display an OTP input screen to the user 10.

In step S80, after receiving notification to display the OTP input screen from the processing computer 50, the in-application SDK 40 can generate a display including an input field for the user 10 to input the OTP they received via their selected contact method.

In step S82, the user 10 can input the OTP in the input field displayed by the in-application SDK 40.

In step S84, after the user 10 inputs the OTP in the input field, the in-application SDK 40 can generate a OTP payload comprising the OTP, the signed nonce, and the contact identifier. The in-application SDK 40 can then transmit the OTP payload to the processing computer 50.

In step S86, after receiving the OTP payload from the in-application SDK 40, the processing computer 50 can validate the signed nonce using the shared secret. In some embodiments, after validating the signed nonce, the processing computer 50 can retrieve the contact method selected by the user 10 by accessing the list of contact methods using the contact identifier. The contact method can then be used to view the OTP status and to retrieve the owner identifier for the current OTP authentication.

In step S88, after retrieving the owner identifier, the processing computer 50 can transmit an OTP status verification request comprising the OTP payload and the owner identifier to the first platform computer 56.

In step S90, after receiving the OTP status verification request from the processing computer 50, the first platform computer 56 can provide a request to view the status of the OTP authentication from the second platform computer 58 by transmitting the OTP payload and the owner identifier.

In step S92, after receiving the owner identifier from the first platform computer 56, the second platform computer 58 can determine an authentication result to determine if the user 10 has successfully completed the OTP authentication. For example, the second platform computer 58 can compare the OTP in the OTP payload to the OTP generated in step S72 and determine if they are the equal. The second platform computer 58 can then transmit the authentication result to the first platform computer 56.

In step S94, after receiving the authentication result from the second platform computer 58, the first platform computer 56 can transmit the authentication result to the processing computer 50.

In step S96, after receiving the authentication result from the first platform computer 56, the processing computer 50 can update the OTP status according to the authentication result. For example, if the user 10 successfully reproduced the OTP, the authentication result would be positive (e.g., the user 10 successfully authenticated themselves) and so the processing computer 50 can update the OTP status to be "complete".

In step S97, the processing computer 50 can inform the in-application SDK 40 that the OTP status is complete.

In step S98, after the user 10 has successfully authenticated themselves, the in-application SDK 40 can transmit a user device details request comprising the encrypted payload to the processing computer 50. The user device details request can be a request to access the main credential and additional information associated with the main credential.

In step S100, after receiving the user device details request from the in-application SDK 40, the processing computer 50 can decrypt the encrypted payload to retrieve the main credential and additional data. For example, the processing computer 50 can decrypt the encrypted payload using a private key in the data elements to retrieve the credential identifier, or PAN, and an expiration date. If the processing computer 50 receives the credential identifier, the processing computer 50 can resolve the credential identifier into a PAN.

Optionally, in step S102, if the processing computer 50 receives a credential identifier, the processing computer 50 can transmit a generate CVV message comprising the card identifier (e.g., a Pan) and the expiry date to the forward API 54.

In step S104, after receiving the credential identifier from the processing computer 50, the forward API can retrieve the user device details in a process such as the one described in steps S206A-S212A of FIG. 2. Through this process, the credential identifier can be resolved into a main credential (e.g., a PAN) and the main credential can be used to retrieve further additional data (e.g., a CVV2).

In step S106, after retrieving the further additional data, the forward API 54 can transmit the further additional data to the processing computer 50.

Alternatively, in step S108, the processing computer 50 can transmit the main credential to the first platform computer 56.

In step S110, after receiving the main credential from the processing computer 50, the first platform computer 56 can retrieve further additional data using the main credential in a process such as the one described in steps S206B-S212B of FIG. 2.

In step S112, after receiving the main credential, the additional data, and the further additional data, the processing computer 50 can generate a user device payload comprising the main credential and the additional data associated with the main credential. The user device payload can then encrypted using an encryption key of an encryption/decryption key pair known by the in-application SDK 40.

In step S114, after encrypting the user device payload, the processing computer 50 can transmit the encrypted user device payload to the in-application SDK 40.

In step S116, after receiving the encrypted user device payload comprising the main credential and the additional data associated with the main credential from the processing computer 50, the in-application SDK 40 can decrypt the encrypted user device payload. The in-application SDK 40 can use the decryption key of the encryption/decryption key pair to decrypt the encrypted user device payload. The in-application SDK 40 can then display the main credential and the additional data associated with the main credential on the display of the mobile device 20. The in-application SDK 40 can display the main credential and the additional data associated with the main credential for the expiration time as determined by the credential time-out duration in the configuration file, after which the display can be closed.

Figure 7:
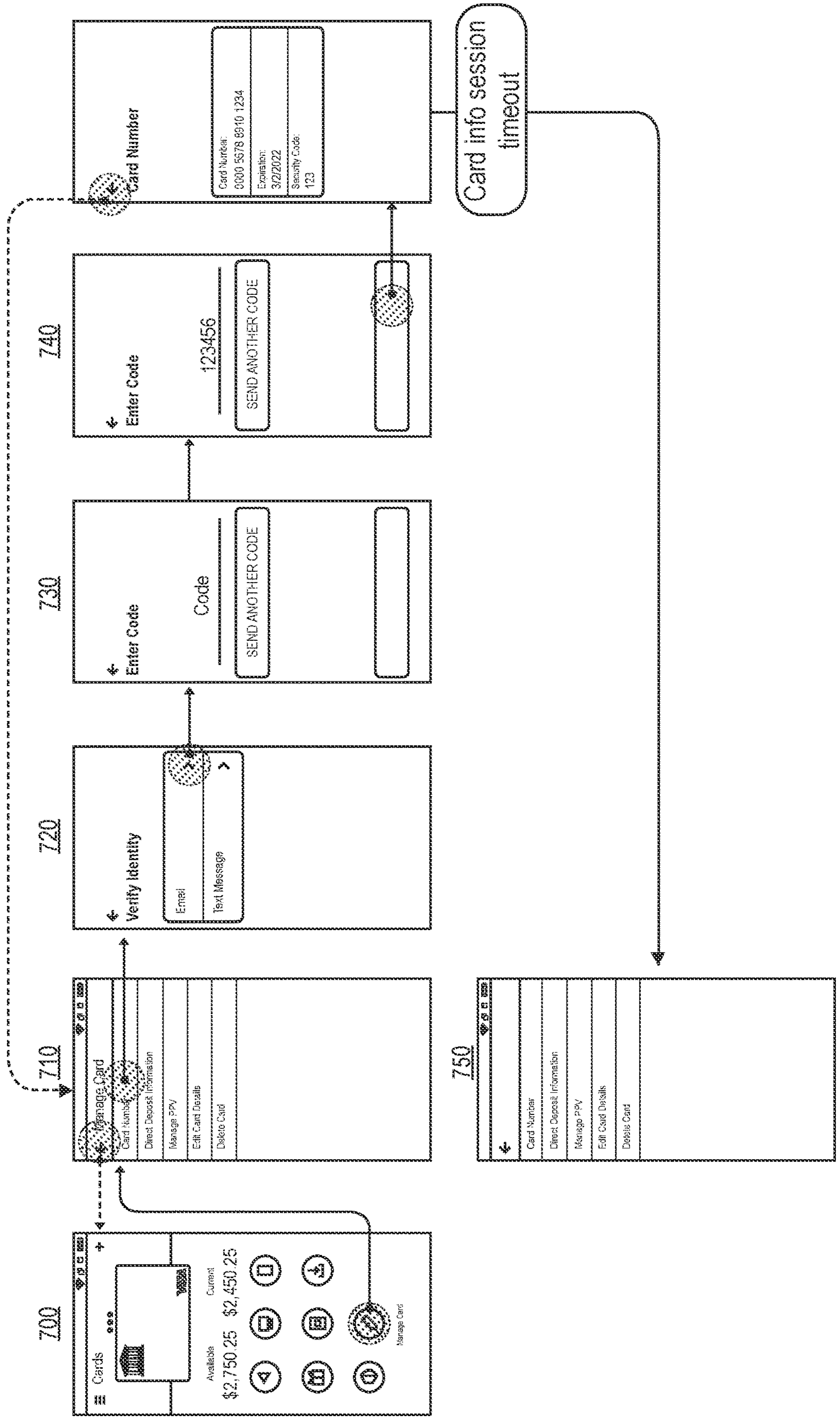
FIG. 7 shows an example user experience according to embodiments.

FIG. 7 shows an example user experience according to embodiments. The user 10 can open the mobile application installed on the mobile device 20. The mobile device 20 can display a first display 700 which displays a list of user devices that are provisioned to the mobile device 20. The user 10 can then select the third user device and the mobile device 20 can thereafter display a second display 710. The second display 710 can display an option for the user 10 to view user device details for the selected third user device. The user 10 can opt to view the user device details, after which the mobile device 20 can display a third display 720 which displays a list of contact methods that can be used to authenticate the user 10 including text and email. The user 10 can then choose a contact method, such as text, and the mobile device 20 can display an input field for the one-time password in a fourth display 730. After the user 10 inputs their one-time password received via the selected contact method, the user 10 can be authenticated. Once the authentication is complete, the mobile device 20 a fifth display 740 can display the main credential (e.g., a PAN) and additional data associated with the main credential (e.g., an expiry date and a CVV2). After an expiry time determined by the credential time-out period is reached, the mobile device 20 can display a sixth display 750, like the second display 710, which displays the option for the user 10 to view user device details for the selected third user device.

Embodiments of the invention provide for a several advantages. Embodiments allow a user to securely provision user devices to their mobile device, and access the user devices. The use of signed nonces provides for secure communications between the mobile device and the processing computer In embodiments, the burden of handling sensitive data shifts away from the users of the sensitive data and to the mobile application server, the processing computer, and authorizing entity computers, all of which are typically designed to handle sensitive data.

Figure 8:
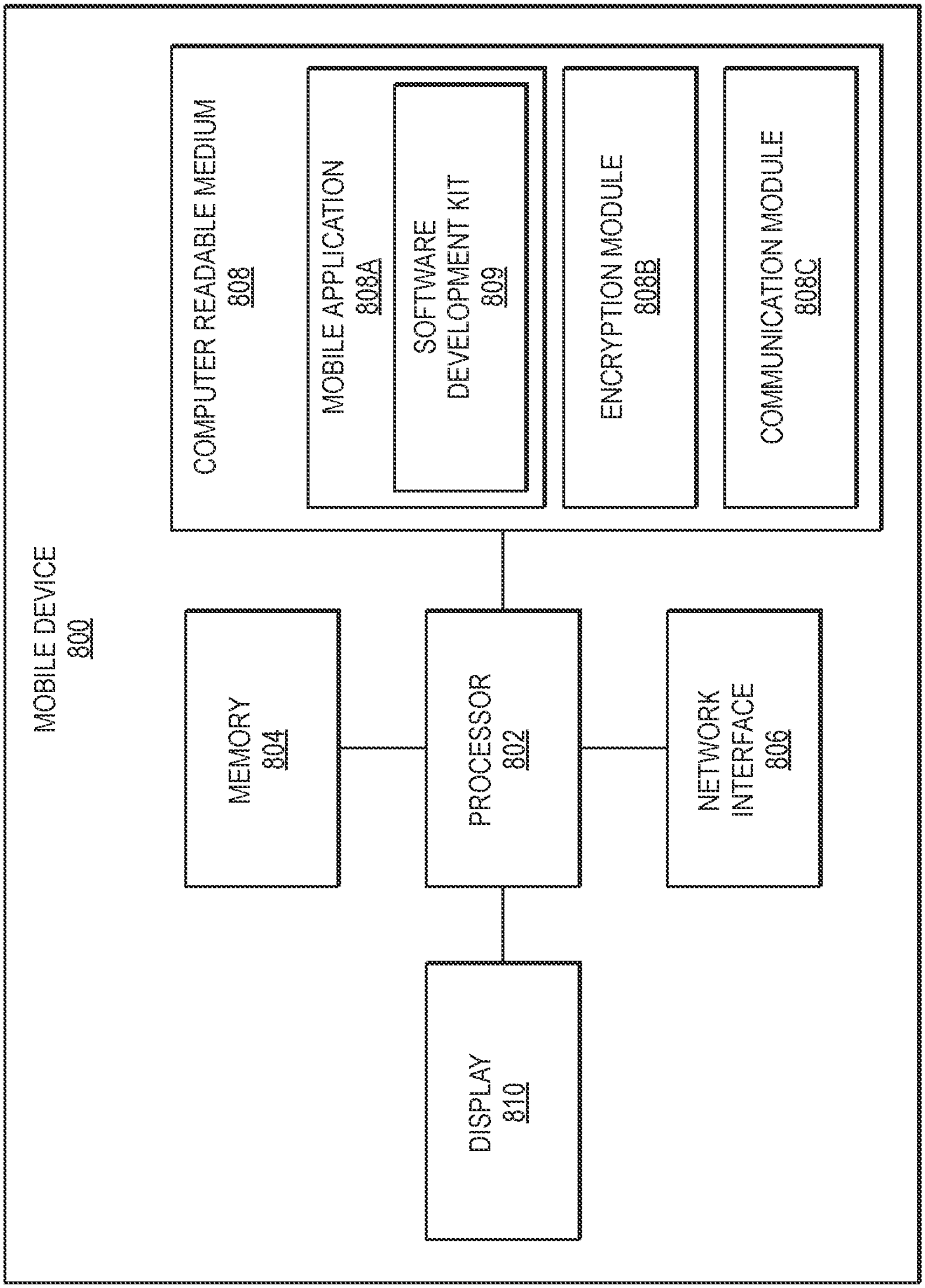
FIG. 8 shows a block diagram of a mobile device according to embodiments.

FIG. 8 shows a block diagram of a mobile device 800 according to embodiments. The mobile device 800 may comprise a processor 802, which may be coupled to a memory 804, a network interface 806, a computer readable medium 808, and a display 810. Examples of the mobile device 800 may be a phone, laptop, computer, etc. The display 810 can be coupled to the processor 802 and can be used to display images or videos. Example types of the display 810 can include LED, OLED, or LCD.

The memory 804 may be coupled to the processor 802 internally or externally (e.g., via cloud-based data storage), and may comprise any combination of volatile and/or non-volatile memory such as RAM, DRAM, ROM, flash, or any other suitable memory device. The memory 804 can store the mobile application, and data relating to the mobile application such as the in-application SDK.

The network interface 806 may include an interface that can allow the mobile device 800 to communicate with external computers and/or devices. The network interface 806 may enable the mobile device 800 to communicate data to and from another device such as a mobile application server and a processing computer, etc. Some examples of the network interface 806 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 806 may include Wi-Fi. Data transferred via the network interface 806 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 806 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 808 may comprise code, executable by the processor 802, for a method comprising: transmitting, by the SDK, an access credential identifier associated with a main credential to a processing computer, wherein the processing computer initiates an authentication process with respect to a user of the main credential, and the processing computer receives the main credential and additional data associated with the main credential; receiving, by the SDK from the processing computer, the main credential and the additional data; and displaying, by the display, via the SDK in the mobile application, the main credential and the additional data.

The computer readable medium 808 may comprise several software modules including, but not limited to, an application module 808A with a software development kit 809, an encryption module 808B, and a communication module 808C.

The application module 808A may comprise code that causes the processor 802 to communicate with a mobile applications server. The application module 808A can allow the mobile device 800 to maintain the mobile application. The application module 808A can have an in-application software development kit 809. The software development kit 809 can facilitate communications between the mobile device 800 and processing computers. For example, the software development kit 809 can generate displays, work in facilitate one-time password authentications, etc.

The encryption module 808B may comprise code that causes the processor 802 to perform encryptions and decryptions. For example, the encryption module 808B can be used to decrypt an encrypted user device payload to retrieve a plaintext main credential and additional data associated with the main credential.

The communication module 808C may comprise code that causes the processor 802 to generate messages, forward messages, reformat messages, and/or otherwise communicate with other entities.

Figure 9:
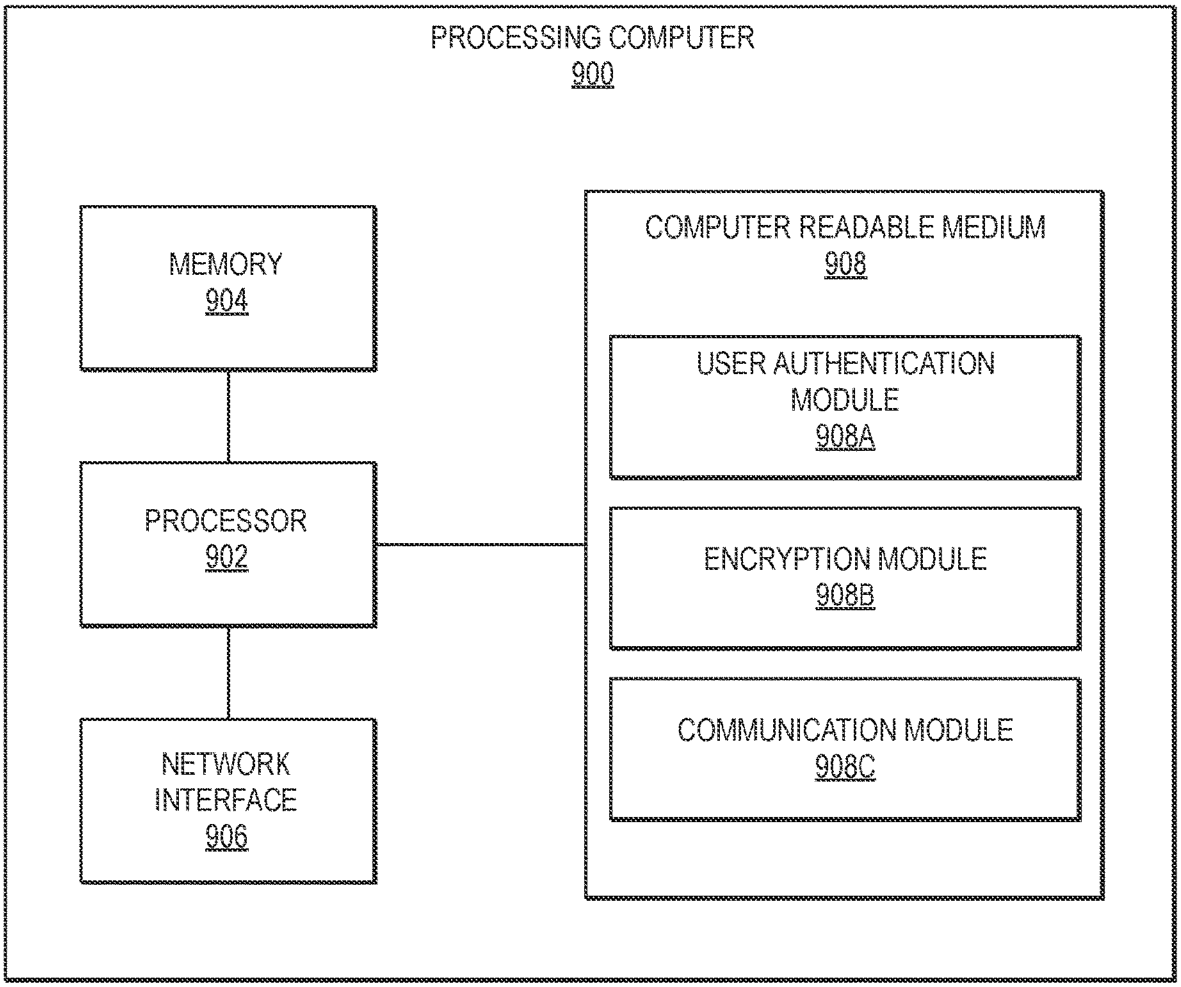
FIG. 9 shows a block diagram of a processing computer according to embodiments.

FIG. 9 shows a block diagram of a processing computer 900 according to embodiments. The processing computer 900 may comprise a processor 902, which may be coupled to a memory 904, a network interface 906, and a computer readable medium 908. The memory 904 and the network interface 906 may have the same or different features to the previously described memory 804 and network interface 806.

The computer readable medium 908 may comprise code, executable by the processor 802, for a method comprising: receiving, by a processing computer from an application comprising a software development kit (SDK) installed on a mobile device, an access credential identifier associated with a main credential to the processing computer; in response to receiving the access credential identifier, obtaining, by the processing computer, the main credential and additional data associated with the main credential; and transmitting, by the processing computer to the SDK in the application of the mobile device, the main credential and the additional data, wherein the mobile device displays the main credential and the additional data.

The computer readable medium 908 may comprise several software modules including, but not limited to, a user authentication module 908A, an encryption module 908B, and a communication module 908C.

The user authentication module 908A may comprise code that causes the processor 902 to facilitate authentication processes with respect to users. The user authentication module 908A can store data associated with a specific user and their user devices. For example, the user authentication module 908A can store configuration files, communication methods, and assist in communications between the processing computer 900 and other external devices. The user authentication module 908A may additionally allow the processing computer 900 to maintain modules and APIs, such as the onboard module and the forward API.

The encryption module 908B, and the communication module 908C may be similar or different than the previously described encryption module 808B and the communication module 808C.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method performed by at least a mobile phone comprising a processor, a memory, and a display coupled to the processor, the memory storing a mobile application comprising a software development kit (SDK), the method comprising:

transmitting, by the SDK, in the mobile application on the mobile phone to a processing computer, an access credential identifier comprising a portion of a credential, the credential comprising a primary account number, wherein the processing computer determines the primary account number and additional data using the portion of the credential, and initiates an authentication process with respect to a user of the primary account number;

receiving, by the SDK in the mobile application on the mobile phone from the processing computer, the primary account number and the additional data;

displaying, by the display of the mobile phone, via the SDK in the mobile application on the mobile phone, the primary account number and the additional data; and providing by the mobile phone, the primary account number and the additional data to a resource provider computer in a transaction, wherein the resource provider computer is programmed to generate an authorization request message comprising the primary account number and the additional data and transmit the authorization request message to an authorizing entity computer for authorization, wherein the primary account number and the additional data are encrypted using an encryption key of an encryption/decryption key pair used by the processing computer and the SDK, and wherein the SDK decrypts the encrypted primary account number and the additional data using a decryption key of the encryption/decryption key pair.

2. The method of claim 1, wherein the additional data includes a CVV2.

3. The method of claim 1, further comprising:

receiving, by the SDK from the processing computer, a nonce and a signed nonce, wherein the signed nonce is formed by signing the nonce using a signing key of a signing/verification key pair, and wherein the signed nonce is used to authenticate communications between the SDK and the processing computer.

4. The method of claim 1, wherein the authentication process comprises:

receiving, by the SDK from the processing computer, a list of one or more contact methods;

transmitting, by the SDK to the processing computer, a contact identifier corresponding to a selection of a contact method;

receiving, by the SDK from the processing computer, a one-time password prompt; and transmitting, by the SDK to the processing computer, a one-time password payload comprising the one-time password.

5. The method of claim 1, wherein the additional data is received by the processing computer from the authorizing entity computer.

6. The method of claim 1, further comprising, after the authentication process:

transmitting, by the SDK to the processing computer, a user device details request comprising an encrypted user device payload, wherein the encrypted user device payload comprises the primary account number and the additional data, wherein the processing computer decrypts the encrypted user device payload and retrieves further additional data associated with the primary account number, and wherein the processing computer forms the encrypted user device payload using the primary account number, the additional data, and the further additional data;

receiving, by the SDK from the processing computer, the encrypted user device payload; and decrypting, by the SDK, the encrypted user device payload to receive the primary account number and the additional data associated with the primary account number.

7. The method of claim 1, wherein the display of the primary account number and the additional data is closed after a credential time-out duration.

8. The method of claim 1, wherein the processing computer communicates with a first platform computer and a second platform computer to perform the authentication process.

9. The method of claim 1, wherein the authentication process comprises a one-time password authentication.

10. The method of claim 1, wherein the processing computer completes the authentication process after updating a one-time password status.

11. The method of claim 1, wherein the credential also includes a user name.

12. The method of claim 1, wherein the primary account number is a credit card number of a debit card number.

13. A mobile phone comprising:

a processor;

a display coupled to the processor; and a non-transitory computer readable medium comprising a mobile application comprising a software development kit (SDK) and instructions, executable by the processor, for implementing operations including:

transmitting, by the SDK in the mobile application on the mobile phone to a processing computer, an access credential identifier comprising a portion of a credential, the credential comprising a primary account number, wherein the processing computer determines the primary account number and additional data using the portion of the credential, and initiates an authentication process with respect to a user of the primary account number;

receiving, by the SDK in the mobile application on the mobile phone from the processing computer, the primary account number and the additional data;

displaying, by the display, via the SDK in the mobile application, the primary account number and the additional data; and providing by the mobile phone, the primary account number and the additional data to a resource provider computer in a transaction, wherein the resource provider computer is programmed to generate an authorization request message comprising the primary account number and the additional data and transmit the authorization request message to an authorizing entity computer for authorization.

14. A method comprising:

receiving, by a processing computer from an application comprising a software development kit (SDK) installed on a mobile phone, a portion of a credential, wherein the credential comprises a primary account number;

in response to receiving the portion of the credential, obtaining, by the processing computer, the primary account number and additional data associated with the primary account number using the portion of the credential; and transmitting, by the processing computer to the SDK in the application of the mobile phone, the primary account number and the additional data, wherein the mobile phone is programmed to display the primary account number and the additional data, and provide the primary account number and the additional data to a resource provider computer, which is programmed to generate an authorization request message comprising the primary account number and the additional data and transmit the authorization request message to an authorizing entity computer for authorization.

15. The method of claim 14, further comprising:

initiating, by the processing computer, an authentication process with respect to a user of the mobile phone before obtaining the primary account number and the additional data.

16. The method of claim 14, wherein the additional data comprises a verification value and an expiration date.

17. The method of claim 14, wherein the credential also includes a user name.

18. The method of claim 14, wherein the primary account number is a credit card number of a debit card number.

* * * * *